United States Patent
Ahmed

(10) Patent No.: US 9,645,992 B2
(45) Date of Patent: May 9, 2017

(54) METHODS AND APPARATUSES FOR INTERACTION WITH WEB APPLICATIONS AND WEB APPLICATION DATA

(75) Inventor: Ali Kamran Ahmed, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 207 days.

(21) Appl. No.: 13/215,178

(22) Filed: Aug. 22, 2011

(65) Prior Publication Data

US 2012/0047425 A1    Feb. 23, 2012

Related U.S. Application Data

(60) Provisional application No. 61/432,593, filed on Jan. 14, 2011, provisional application No. 61/375,826, filed on Aug. 21, 2010.

(51) Int. Cl.
*G06F 17/24* (2006.01)
*G06F 17/22* (2006.01)
*G06F 17/30* (2006.01)

(52) U.S. Cl.
CPC ........ *G06F 17/248* (2013.01); *G06F 17/2264* (2013.01); *G06F 17/243* (2013.01); *G06F 17/30905* (2013.01)

(58) Field of Classification Search
CPC ........... G06F 17/2247; G06F 17/30905; G06F 17/2264; G06F 17/243; G06F 17/211; G06F 17/227
USPC .......................... 715/234, 235, 908, 249, 223
See application file for complete search history.

(56) References Cited

U.S. PATENT DOCUMENTS

| | | | |
|---|---|---|---|
| 5,892,904 | A | 4/1999 | Atkinson et al. |
| 5,923,756 | A | 7/1999 | Shambroom |
| 6,052,739 | A | 4/2000 | Bopardikar et al. |
| 6,151,606 | A | 11/2000 | Mendez |

(Continued)

FOREIGN PATENT DOCUMENTS

| | | |
|---|---|---|
| CN | 104903905 | 9/2015 |
| CN | 104903909 | 9/2015 |

(Continued)

OTHER PUBLICATIONS

Huawei AnyOffice Mobile Security Solution, Huawei Technologies Co., http://enterprise.huawei.com/ilink/enenterprise/download/HW__277458, 2013, 12 pages.

(Continued)

*Primary Examiner* — Scott Baderman
*Assistant Examiner* — Seung Jung
(74) *Attorney, Agent, or Firm* — Kilpatrick Townsend & Stockton LLP

(57) ABSTRACT

A method of enabling content distribution for various electronic devices which comprises providing a content adaptive application for an electronic device, wherein the content adaptive application is designed to parse an abstraction schema to retrieve data or a data source, and format information. The content adaptive application further formats the data or data from the data source into at least one of a plurality of platform specific templates specified by the format information and displays at least one platform specific template including at least a portion of the data or data from the data source on a display of the electronic device.

20 Claims, 11 Drawing Sheets

(56) References Cited

U.S. PATENT DOCUMENTS

| | | |
|---|---|---|
| 6,226,618 B1 | 5/2001 | Downs et al. |
| 6,317,868 B1 | 11/2001 | Grimm et al. |
| 6,324,648 B1 | 11/2001 | Grantges, Jr. |
| 6,484,276 B1 | 11/2002 | Singh et al. |
| 6,735,763 B1 | 5/2004 | Enokida |
| 6,993,137 B2 | 1/2006 | Fransdonk |
| 6,996,808 B1 | 2/2006 | Niewiadomski et al. |
| 7,159,120 B2 | 1/2007 | Muratov |
| 7,184,801 B2 | 2/2007 | Farcasiu |
| 7,243,163 B1 | 7/2007 | Friend et al. |
| 7,275,073 B2 | 9/2007 | Ganji et al. |
| 7,447,799 B2 | 11/2008 | Kushner |
| 7,596,565 B2 | 9/2009 | Friend et al. |
| 7,620,001 B2 | 11/2009 | Ganji |
| 7,620,392 B1 | 11/2009 | Maurya et al. |
| 7,702,322 B1 | 4/2010 | Maurya et al. |
| 7,788,382 B1 | 8/2010 | Jones et al. |
| 7,849,451 B2 | 12/2010 | Palacz et al. |
| 7,886,148 B2 | 2/2011 | Kiriansky et al. |
| 7,920,631 B2 | 4/2011 | Vicars-Harris |
| 7,984,157 B2 | 7/2011 | Panasyuk et al. |
| 8,001,082 B1 | 8/2011 | Muratov |
| 8,261,320 B1 | 9/2012 | Serenyi et al. |
| 8,284,933 B2 | 10/2012 | Chaisson et al. |
| 8,549,656 B2 | 10/2013 | Blaisdell et al. |
| 8,584,118 B2 | 11/2013 | Kotamarthi et al. |
| 8,595,841 B2 | 11/2013 | Britton et al. |
| 9,129,112 B2 | 9/2015 | Boyer et al. |
| 9,246,893 B2 | 1/2016 | Boyer et al. |
| 9,344,422 B2 | 5/2016 | Aamir et al. |
| 2001/0047365 A1 | 11/2001 | Yonaitis |
| 2001/0047510 A1 | 11/2001 | Angel et al. |
| 2002/0073402 A1 | 6/2002 | Sangavarapu et al. |
| 2002/0169954 A1 | 11/2002 | Bandini et al. |
| 2003/0182460 A1 | 9/2003 | Khare |
| 2004/0006630 A1 | 1/2004 | Friend et al. |
| 2004/0117310 A1 | 6/2004 | Mendez et al. |
| 2004/0163088 A1* | 8/2004 | Frender et al. ............... 719/313 |
| 2004/0172640 A1 | 9/2004 | Luo et al. |
| 2004/0224675 A1 | 11/2004 | Puskoor et al. |
| 2005/0033983 A1 | 2/2005 | Takekawa et al. |
| 2005/0039186 A1 | 2/2005 | Borkan |
| 2005/0154886 A1 | 7/2005 | Birk et al. |
| 2005/0240943 A1 | 10/2005 | Smith et al. |
| 2006/0190934 A1 | 8/2006 | Kielstra et al. |
| 2006/0277408 A1 | 12/2006 | Bhat et al. |
| 2007/0016961 A1 | 1/2007 | Vogler et al. |
| 2007/0157134 A1 | 7/2007 | Cheng et al. |
| 2007/0234408 A1 | 10/2007 | Burch et al. |
| 2007/0250539 A1 | 10/2007 | Montgomery |
| 2008/0037593 A1 | 2/2008 | Friedman et al. |
| 2008/0060080 A1 | 3/2008 | Lim |
| 2008/0134311 A1 | 6/2008 | Medvinsky et al. |
| 2008/0289019 A1 | 11/2008 | Lam |
| 2008/0292103 A1 | 11/2008 | Lee et al. |
| 2008/0307300 A1* | 12/2008 | Kitayama et al. ............ 715/234 |
| 2008/0320566 A1 | 12/2008 | Herzog et al. |
| 2009/0044103 A1* | 2/2009 | Chalecki et al. ............. 715/234 |
| 2009/0222792 A1 | 9/2009 | Shanbhogue et al. |
| 2009/0228716 A1 | 9/2009 | Poston et al. |
| 2009/0288143 A1 | 11/2009 | Stebila et al. |
| 2009/0300656 A1* | 12/2009 | Bosworth et al. ............ 719/320 |
| 2009/0307191 A1 | 12/2009 | Li et al. |
| 2010/0042396 A1 | 2/2010 | Cassani et al. |
| 2010/0057845 A1 | 3/2010 | Thomas et al. |
| 2010/0138905 A1 | 6/2010 | Kass |
| 2010/0154041 A1 | 6/2010 | Dalzell et al. |
| 2010/0174974 A1* | 7/2010 | Brisebois et al. ............ 715/223 |
| 2010/0212028 A1 | 8/2010 | Eriksson et al. |
| 2010/0281475 A1* | 11/2010 | Jain et al. .................... 717/172 |
| 2011/0035593 A1 | 2/2011 | Pyle et al. |
| 2011/0047451 A1 | 2/2011 | Jardine-Skinner et al. |
| 2011/0083069 A1* | 4/2011 | Paul et al. .................... 715/234 |
| 2011/0107089 A1 | 5/2011 | Koottayi et al. |
| 2011/0185040 A1* | 7/2011 | Schmidt ........................ 709/217 |
| 2011/0191593 A1 | 8/2011 | Cheng |
| 2011/0258345 A1* | 10/2011 | Bhanote ........................ 709/248 |
| 2012/0047451 A1 | 2/2012 | Marmaros |
| 2012/0066601 A1* | 3/2012 | Zazula .................. H04N 21/854 715/733 |
| 2013/0014275 A1 | 1/2013 | Goodes et al. |
| 2013/0227291 A1 | 8/2013 | Ahmed et al. |
| 2013/0262687 A1 | 10/2013 | Avery et al. |
| 2013/0326221 A1 | 12/2013 | Murphy et al. |
| 2013/0332723 A1 | 12/2013 | Tan et al. |
| 2014/0018048 A1 | 1/2014 | Anand et al. |
| 2014/0173700 A1 | 6/2014 | Awan et al. |
| 2014/0281548 A1 | 9/2014 | Boyer et al. |
| 2014/0282465 A1 | 9/2014 | Matenaar et al. |
| 2014/0282833 A1 | 9/2014 | Boyer et al. |
| 2014/0325664 A1 | 10/2014 | Nekhoroshev |
| 2015/0066859 A1 | 3/2015 | Blake |
| 2015/0220541 A1 | 8/2015 | Parameswaran et al. |
| 2015/0371045 A1 | 12/2015 | Boyer et al. |
| 2016/0087953 A1 | 3/2016 | Aamir et al. |
| 2016/0112458 A1 | 4/2016 | Boyer et al. |
| 2016/0241598 A1 | 8/2016 | Aamir et al. |

FOREIGN PATENT DOCUMENTS

| | | |
|---|---|---|
| CN | 104904181 | 9/2015 |
| EP | 474131 | 3/1992 |
| EP | 1122640 | 8/2001 |
| EP | 1458151 | 9/2004 |
| EP | 1577736 | 9/2005 |
| EP | 1841174 | 10/2007 |
| EP | 2632108 | 8/2013 |
| EP | 2692162 | 2/2014 |
| EP | 2973140 | 1/2016 |
| EP | 2973142 | 1/2016 |
| EP | 2973183 | 1/2016 |
| EP | 2632108 | 11/2016 |
| JP | 2016512374 | 4/2016 |
| JP | 2016513945 | 5/2016 |
| JP | 2016514912 | 5/2016 |
| WO | 9726731 | 7/1997 |
| WO | 03102753 | 12/2003 |
| WO | 2007047183 | 4/2007 |
| WO | 2014144939 | 9/2014 |
| WO | 2014144961 | 9/2014 |
| WO | 2014145039 | 9/2014 |
| WO | 2016048404 | 3/2016 |

OTHER PUBLICATIONS

About EASE, https://apperian.jira.com/wiki/display/rub/Appiication+Policies#ApplicationPoliciesEncryptedDAR (DataRest), Feb. 26, 2013, 10 pages App Sense RapSphere, 10 pages.

App Sense RapSphere, http://www.consumerizeit.com/blogs/consumerizations/archive/2012/05/11/citrix-synergy-2012-video-a-first-look-at-appsense-rapsphere-mobile-app-management-and-app-wrapping.aspx, May 11, 2012, 3 pages.

Article on Mocana Mobile, http://www.consumerizeit.com/blogs/consumerization/archive/2012/06/08/app-wrapping-withmocana-mobile-app-protection.aspx, Aug. 6, 2012, 2 pages.

CloudGateway, http://www.consumerizeit.com/blogs/consumeriza-tion/archive/2012/05/11/citrix-synergy-2012-video-cloudaatewav-2-mobile-application-manaqement.aspx, May 11, 2012, 3 pages.

Google Groups on iOS Swizzle, https://groups.google.com/forum/#!msg/three20/6mBrQRRVVXnU/yxWNZuDrnYOJ, May 11, 2010, 24 pages.

How to re-sign Apple's applications once they've been modified, MacNN Forum thread, http://forums.macnn.com/79/developer-cen-ter/355720/how-re-sign-apples-applications-once/, Dec. 2, 2007, 4 pages.

Ios Place, http://blog.iosplace.com/?p=33, Oct. 1, 2010, 3 pages.

Landscapes in Mobile Application Security, Facilelogin, http://blog.facilelogin.com/2013/1O/landsca(2es-in-mobilea(2(21ication.html, Oct. 2013, 5 pages.

Mach-o-infection, https://reverse.put.as/wp-content/uploads/2011/06/mach-o_infection.ppt, 46 pages.

(56) References Cited

OTHER PUBLICATIONS

Network px blogspot, http://networkpx.blogspot.com/2009/09/about-lcdyldinfoonlv-command.html, Sep. 20, 2009, 6 pages.
Stackoverflow, http://stackoverflow.com/guestions/882553'7/mach-o-symbol-stubs-ios, Jan. 11, 2012, 4 pages.
Elbaz, Using Public Key Cryptography in Mobile Phones, Discretix Technologies,http://dev1.discretix.com/wpcontenUuploads/2013/02/Using_Public_Key_Cryptography_in_Mobile_Phones.pdf, Oct. 2002, 9 pages.
Mallikarjuna et al., Unveiling of Android Platform, Ijarcsse, vol. 3, Issue 7, http://www.ijarcsse.com/docs/papersNolume_3/7July2013N317-0441.pdf, Jul. 2013, pp. 1264-1267.
Miller et al., Chapter4: Code Signing and Memory Protections, iOS Hackers' Handbook, http://books.google.ca/books?id=1kDcjkcz9GwC&printsec=frontcover#v=onepage&q&f=false, May 8, 2012, pp. 69-105.
Singh, Mac OS X Internals: A Systems Approach, http://www.amazon.com/Mac-OS-Internals-Systems-Approach/dp/0321278542, Jun. 29, 2006, pp. 61-74.
Zdziarski, Hacking and Securing iOS Applications, https://www.amazon.com/Hacking-Securing-iOS-Applications-Hijacking/dp/1449318746/ref=pd_bxgy_b_img_b/184-9916216-5442607, Hacking Part-1, pp. 189-202; Hacking Part-2, pp. 149-156 and pp. 203-208, Jan. 25, 2012.
European Application No. 13156805.7, Office Action mailed on Apr. 13, 2015, 5 pages.
European Application No. 13156805.7, Office Action mailed on Oct. 29, 2015, 5 pages.
European Application No. 14762378.9, Extended European Search Report mailed on Jul. 1, 2016, 7 pages.
International Application No. PCT/US2014/029552, International Preliminary Report on Patentability mailed on Sep. 24, 2015, 11 pages.
International Application No. PCT/US2014/029552, International Search Report and Written Opinion mailed on Jul. 1, 2014, 15 pages.
International Application No. PCT/US2014/029586, International Preliminary Report on Patentability mailed on Sep. 24, 2015, 8 pages.
International Application No. PCT/US2014/029586, International Search Report and Written Opinion mailed on Jul. 31, 2014, 12 pages.
International Application No. PCT/US2014/029680, International Preliminary Report on Patentability mailed on Sep. 24, 2015, 9 pages.
International Application No. PCT/US2014/029680, International Search Report and Written Opinion mailed on Jul. 1, 2014, 15 pages.
International Application No. PCT/US2015/011136, International Search Report and Written Opinion mailed on Mar. 24, 2015, 12 pages.
International Application No. PCT/US2015/011136, Written Opinion mailed on Oct. 5, 2015, 10 pages.
U.S. Appl. No. 13/841,498, Non-Final Office Action mailed on Oct. 8, 2014, 18 pages.
U.S. Appl. No. 13/841,498, Notice of Allowance mailed on May 4, 2015, 11 pages.
U.S. Appl. No. 14/213,244, Final Office Action mailed on May 18, 2015, 13 pages.
U.S. Appl. No. 14/213,244, Non-Final Office Action mailed on Nov. 7, 2014, 11 pages.
U.S. Appl. No. 14/213,244, Notice of Allowance mailed on Sep. 18, 2015, 8 pages.
U.S. Appl. No. 14/213,244, Supplemental Notice of Allowability mailed on Oct. 14, 2015, 2 pages.
U.S. Appl. No. 14/594,377, Notice of Allowance mailed on Jan. 15, 2016, 22 pages.
U.S. Appl. No. 14/842,608, Non-Final Office Action mailed on Apr. 13, 2016, 13 pages.
European Application No. 13156805.7, Extended European Search Report mailed on Jun. 6, 2013, 5 pages.
European Application No. 14765558.3, Extended European Search Report mailed on Aug. 11, 2016, 7 pages.
U.S. Appl. No. 13/405,357, Final Office Action mailed on Aug. 8, 2016, 13 pages.
U.S. Appl. No. 13/405,357, Final Office Action mailed on Jun. 12, 2014, 17 pages.
U.S. Appl. No. 13/405,357, Non-Final Office Action mailed on Feb. 11, 2016, 13 pages.
U.S. Appl. No. 13/405,357, Non-Final Office Action mailed on Oct. 23, 2013, 13 pages.
U.S. Appl. No. 14/842,608, Notice of Allowance mailed on Aug. 30, 2016, 10 pages.
European Application No. 14764811.7, Extended European Search Report mailed on Sep. 19, 2016, 9 pages.
International Application No. PCT/US2015/011136, International Preliminary Report on Patentability mailed on Sep. 28, 2016, 10 pages.
U.S. Appl. No. 14/842,608, Notice of Allowance mailed on Sep. 23, 2016. 7 pages.
U.S. Appl. No. 14/970,477, Non-Final Office Action mailed on Sep. 23, 2016, 14 pages.
U.S. Appl. No. 14/842,608, Notice of Allowance mailed on Nov. 8, 2016, 7 pages.
U.S. Appl. No. 14/970,477, Final Office Action mailed on Dec. 22, 2016, 8 pages.
U.S. Appl. No. 14/970,477, Notice of Allowance mailed on Jan. 27, 2017, 5 pages.

\* cited by examiner

```
<div id="content">
    <h3>Please enter contact info.</h3>            <form name="Contacts"
            data-bitzer-title="Contact"
            data-bitzer-desc="Contacts List"
            data-bitzer-type="COMPONENT"
            data-bitzer-data-url="/mysugarm/Contacts/Data.php"
            data-bitzer-sync-scheme="WEBAPP_SOFT"
            data-bitzer-pagination="true"
            action="Save.php" method="POST"
            enttype="multipart/form-data">
        <input type="hidden" name="id" value=""
            data-bitzer-primary-key="true"
            data-bitzer-type="Integer">
                    <table class="form" width="100%">

<tr>
            <th width="27%">
                <div align="left">
                    Photo
                </div>
            </th>
            <td>
                <input data-bitzer-label="Photo"
                    data-bitzer-short-label="Pic"
                    data-bitzer-type="image"
                    data-bitzer-help-text="Photo of contact"
                    type="file" name="photo_c"
                    size="50"
                    data-bitzer-display-group-name="Personal"
                    >
            </td>
```

*FIG. 4*

Welcome to Simple Expenses

Please enter your expense item

| Reference Number | 19 |
| --- | --- |
| Expense Date | 11/10/2011 |
| Expense Type | Airfare ▾ |
| Payment Type | Cash ▾ |
| Client | Bitzer ▾ |
| Price | $134.50 |
| Description | Lunch |
| Notes | |
| Billable | ☑ |

[ Save ] [ Cancel ]

---

📶 Carrier 📶   12:33 PM   🔋

〈 Expenses   Expense Item   [ Edit ]

Client Bitzer

Description Lunch

Ref Num... 19

Price $134.50

Expense... Entertainment

Notes

Date 11/10/2011 00:00:00.0

Payment Cash

☆ Favorites | 📱 My Apps | 📊 Dashboards | 🔄 Sync | ⋯ More

*FIG. 6*

METHODS AND APPARATUSES FOR INTERACTION WITH WEB APPLICATIONS AND WEB APPLICATION DATA

This application claims the benefit of U.S. Provisional Application No. 61/432,593, filed Jan. 14, 2011, and U.S. Provisional Application No. 61/375,826, filed Aug. 21, 2010, which are hereby incorporated by reference.

FIELD

The present patent document relates to electronic device applications to interact with web applications and web application data. In particular, the present patent document relates to methods, apparatuses and systems for platform independent content display on an electronic mobile device and remote monitoring and control of content.

BACKGROUND

Today, many businesses use computer applications to interact with customers, vendors, partners and employees. Traditional access to these business computer applications requires dedicated software on a local computing client like a desktop or workstation computer. To improve scaling and remove the need for dedicated software, access to most networked computer applications is currently through a standard web browser that points to external and internal websites. Generally speaking, applications with web based access may be referred to as web applications.

Architecturally, most web applications have a presentation layer that is accessed by a web browser running on a standard laptop or desktop. This presentation layer typically consists of standard technologies like HTML, Adobe Flash, XML, Java etc. to provide users a rich interactive experience. With the proliferation of mobile devices, businesses want to provide web application access to their customers, vendors, partners and employees through mobile devices such as smart phones, handhelds, tablets, netbooks and thin clients.

When mobile device users access the same typical web application presentation layer that a web browser on a personal computer with a full-sized monitor uses, their experience is poor. The reason for this poor experience is because mobile devices typically have a smaller screen, they do not support a separate keyboard, they consist of varied hardware and processor components as compared to traditional computers, and in some cases do not support a full fledge web browser. This results in suboptimal web application functionality or no functionality at all. Additionally, web browsers on mobile devices may not have full access to advanced features of new mobile platforms like gesture sensors, compass, headset, location sensors, GPS, cameras and proprietary UI (user interface) features. The restricted access to the full advanced feature set of the mobile platform further reduces the user experience.

To solve this problem conventional wisdom has led software vendors to build simple and small website pages targeted for mobile device access through WAP gateways. However, the experience with such pages has not been popular and consequently, the growth and adoption of simple web pages for enterprise and web application access has been limited.

Moving forward there has been a new paradigm shift in mobile devices to access web applications. This new paradigm uses native software or applications running on mobile devices to access web applications. Examples of such native software are iPhone® (i.e., iOS®) and/or Android® applications. The native applications on these mobile devices communicate with web applications using standard or proprietary transport mechanisms like TCP, SSL, HTTP and other similar technologies. Such native applications can interact with the web application data in an optimized fashion using the mobile device's specific hardware capability and graphical user interface features.

These native applications are typically custom built for each target web application and for each separate mobile platform. This means that each web application will need multiple corresponding mobile device applications to match the target hardware and address a specific function or portion of the web application. This strategy exponentially increases the complexity and cost of building and managing native mobile device applications for corresponding web applications. While expensive and burdensome, this native mobile device application strategy has gained momentum for consumer applications that have thousands of users. This point is evident by the success of the iPhone App Store® and Android App Marketplace®.

However, the cost and complexity is increasing for businesses that desire a native mobile device application for each mobile platform and for each enterprise application. Developers are required to customize views based on role based access control, add enterprise specific security, and integrate the application with existing web applications. This is very expensive and time consuming. Additionally, the skill set required to build native mobile applications is practically non-existent in company IT organizations.

In addition to the problems with creating the custom applications, enterprises are entering the next generation of remote access, productivity and connectivity by offering access to corporate data and applications on personally purchased mobile devices. With the explosion of native consumer applications employees are demanding enterprises support and offer remote access to work-related applications on their personally purchased mobile devices.

Supporting personally purchased devices in the corporate environment is a problem for companies because employees control the data on their device. Employees may leave at anytime with their personally purchased device and take the corporate data and applications with them on their mobile device. Companies have no basis to ask employees for their device so they can wipe company data. Furthermore, there are unanswered questions regarding company liability, confidentiality, care and other legal issues surrounding the mixing of corporate and personal data.

CIOs, IT, and developers need a comprehensive solution that will secure and isolate corporate data on personal devices, enable native application based access to enterprise applications, provide offline synchronization capabilities and most importantly give IT full control of company data and access rights.

SUMMARY

In view of the foregoing, one aspect of the various disclosed embodiments in the present patent document is to provide improved methods and apparatuses for interaction with web applications and web application data. Preferably the methods and apparatuses address, or at least ameliorate, one or more of the problems described above. To this end, a method for enabling content distribution for various electronic devices is provided. The method comprises providing an application for each of a plurality of different electronic devices, wherein each of the applications is designed to:

parse an abstraction schema to retrieve data or a data source, and format information; format the data into at least one of a plurality of platform specific templates specified by the format information; and display at least one platform specific template including at least a portion of the data on the electronic device.

In some embodiments, HTML tags may be used as the abstraction schema. In particular HTML5 tags may be used. The tags may be custom tags.

Various embodiments may be used with various different electronic devices including, a personal computer, mobile device, smart-phone, personal data assistant, laptop computer, tablet computer, and many others.

In some embodiments, the data may be part of a web page that is consumed by the electronic device. In other embodiments, the data may be remotely located. In embodiments where the data is remotely located, the data may reside on a web server or other networked computer. In such embodiments, the application may initially only be aware of a data source that it must retrieve data from or sync data with.

In embodiments where the data is remotely located, the abstraction layer or virtualization layer may be part of a separate file designed to allow the application to interface with a web server.

In another aspect of the embodiments of the present patent document, a method of rendering web content onto a display of an electronic device is provided. The method comprises processing a virtualization layer to map web content to a template designed for display on the electronic device, and causing the template to be rendered on a display of the electronic device.

In yet another aspect of the embodiments disclosed herein, an application for an electronic device is provided. The application comprises a plurality of templates designed for display on a display of the electronic device and a parsing module designed to consume an abstraction layer and map data to at least one of the plurality of templates. The templates are designed to customize the display of the data for the electronic device.

In some embodiments, the templates are designed to be one of a plurality of templates in a template style each template of a template style designed for customizing the display of the data on a separate electronic device in a similar style.

In another embodiment, a method of enabling content distribution for various electronic devices is provided. The method comprises providing a platform independent data file wherein the platform independent data file includes: an abstraction schema to abstract data or a data source; and format information designed to specify mapping at least a portion of the data, or at least a portion of data from the data source, to a platform specific template residing in a content adaptive application for an electronic device.

In some embodiments, the platform independent data file is a web page designed for display on a web browser. In other embodiments, the data file may be specifically designed for consumption by the device and may not be designed to be displayed on a web browser. In yet other embodiments, the data file may both display on a web browser and be consumable by the device.

In another aspect of the embodiments of the present patent document, a web content file is provided. The web content file comprises a virtualization layer that abstracts the web content into categories; and format information designed to map the categories to a template style, wherein the template style includes a plurality of templates each designed to display at least a portion of the web content in a format designed for a particular electronic device but in a similar style.

In some embodiments, the web content file is a web page designed for display on a web browser. In other embodiments, it is a file or files that are designed to abstract data from a web server but are not necessarily designed to be themselves displayed by a web browser.

In yet another aspect of the embodiments disclosed herein, a method of remotely monitoring data on an electronic device is provided. The method comprises providing an application for a mobile electronic device that includes provisioning services and encrypts data stored locally on the mobile electronic device, wherein the provisioning services are designed to monitor the use of the application and provide a third party administrator with statistics on the use of the application and also allow the third party administrator to manipulate data on the mobile electronic device.

Some embodiments of the method of remotely monitoring data on an electronic device further comprise the step of providing a platform independent data file that is designed to allow the application to interact with a web application.

In yet another aspect of the embodiments disclosed herein, an application for a mobile electronic device is provided. The application comprises a secure data storage module designed to encrypt data stored locally on the mobile electronic device; and a service provisioning module designed to: monitor the use of the application; provide a third party administrator with statistics on the use of the application; and allow the third party administrator to manipulate data on the mobile electronic device.

The apparatuses and methods for interaction with web applications and web application data described herein provide benefits over other methods and apparatuses. Further aspects, objects, desirable features, and advantages of the devices and methods disclosed herein will be better understood from the detailed description and drawings that follow in which various embodiments are illustrated by way of example. It is to be expressly understood, however, that the drawings are for the purpose of illustration only and are not intended as a definition of the limits of the claimed embodiments.

BRIEF DESCRIPTION OF THE DRAWINGS

FIG. 4 illustrates one example of a web content file including an abstraction schema that uses tags.

FIG. 6 illustrates how a web application input form may be displayed in a web browser and also displayed in a native format on an electronic device.

DETAILED DESCRIPTION OF THE EMBODIMENTS

Figure 1:
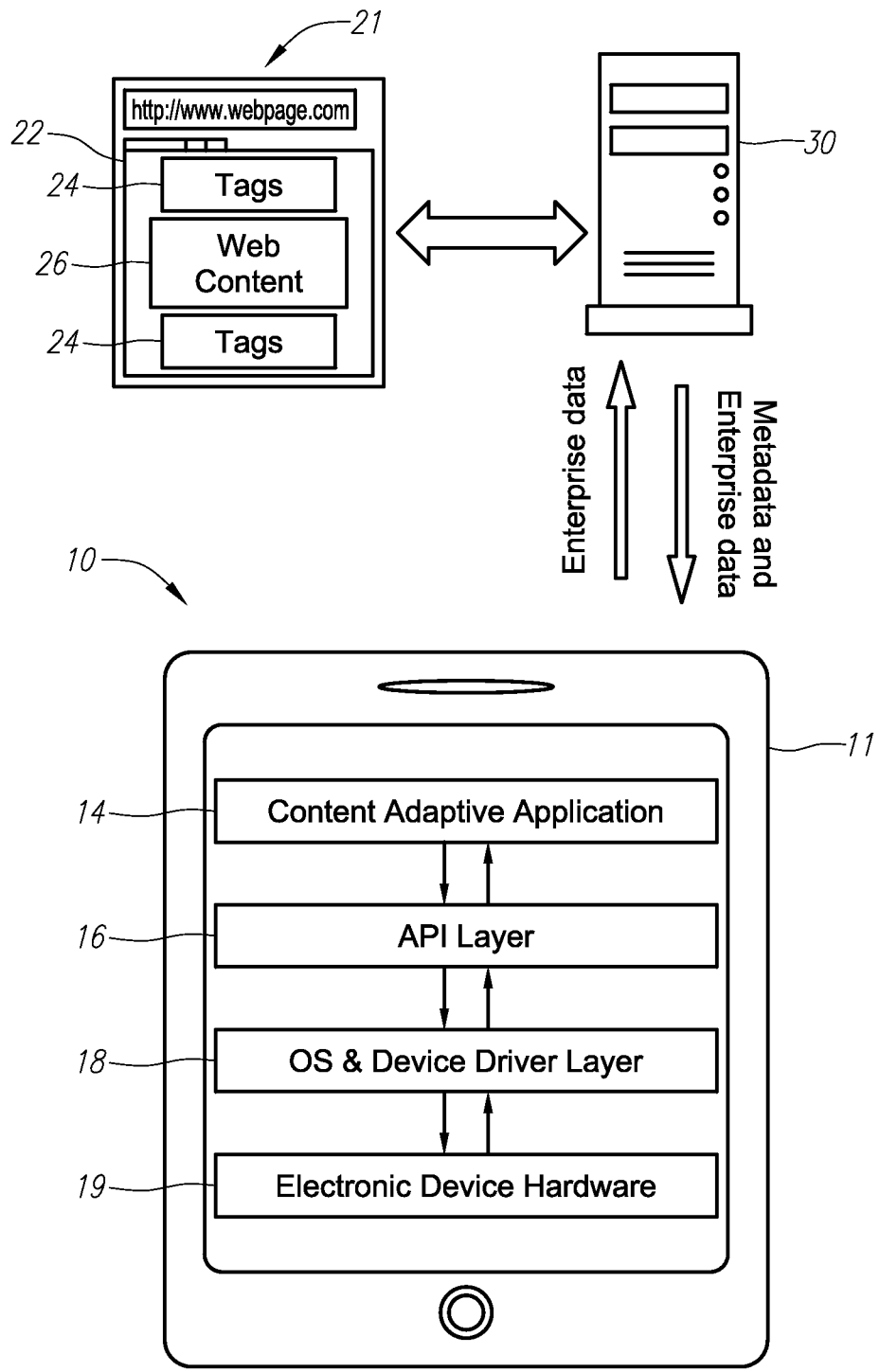
FIG. 1 illustrates an embodiment of a content distribution system for use with various electronic devices.

The following detailed description includes representative examples utilizing numerous features and teachings, both separately and in combination, and describes numerous embodiments in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

Some portions of the detailed descriptions that follow are presented in terms of algorithms and sequences of operations which are performed within a computer memory. These algorithmic descriptions and representations are the means used by those skilled in the data processing arts to most effectively convey the substance of their work to others skilled in the art. An algorithm or sequence of operations is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic device, that manipulates and transforms data represented as physical (electronic) quantities within the computer system's registers and memories into other data similarly represented as physical quantities within the electronic device's memory or registers or other such information storage, transmission or display devices.

The embodiments disclosed also relate to an apparatus for performing the operations herein. This apparatus may be specially constructed for the required purposes, or it may comprise a general purpose processor selectively activated or reconfigured by a computer program stored in the electronic device. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, Flash memory, magnetic or optical cards, or any type of media suitable for storing electronic instructions, and each coupled to a computer system bus.

The algorithms presented herein are not inherently related to any particular electronic device or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the embodiments as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present patent document describes unique systems and methods for native mobile device applications and other computer based software applications to interact with web applications and web application data. Many enterprises are looking for a solution to mobilize their existing web applications. Embodiments of the present patent document provide a simple yet very powerful framework that enables IT professionals, developers, and system integrators to easily mobilize their existing web applications by using a simple virtualization layer (VL). The VL sits alongside your existing applications and acts as an alternate presentation layer. Once you create a VL, the content adaptive application running locally on the electronic device will consume the VL and provide a native, interactive experience to the user. A content adaptive application is deployed as a native application on mobile and other devices and is available in various embodiments with numerous features including but not limited to custom branding, full IT admin control, and enterprise security features.

FIG. 1 illustrates an embodiment of a content distribution system 10 for use with various electronic devices. The content distribution system includes a VL in the form of tags 24, and a content adaptive application 14. The content distribution system 10 is designed to allow platform independent development of web applications.

Content display system 10 includes an electronic device 11, web application 21, and web application server 30. Electronic device 11 may be any electronic device including a computer, laptop, mobile phone, mobile tablet, personal data assistant (PDA) or any other type of electronic device. Furthermore, electronic device 11 may be either a mobile device or may be a wired computer or other stationary system. In a preferred embodiment, the electronic device 11 may be a mobile device. In an even more preferable embodiment, the electronic device 11 may be a smart-phone such as the iPhone®, Blackberry®, Android® based phone, or one of many other smart-phones.

Upon request, web server 30 transmits web page 22 including web content 26 which may be displayed on a typical HTML based web browser such as Internet Explorer®, Chrome®, or any other type of browser. In content display system 10, web page 22 may also be received by an electronic device 11. When web page 22, which includes a VL in the form of tags 24, is received by a content adaptive application 14, web content 26 may be optimally displayed on the display of the electronic device 11 despite web page 22 not being particularly formatted for the display of the electronic device 11. Furthermore, web content 26 may be optimally displayed on the displays of various different electronic devices 11 despite web page 22 not being particularly formatted for display on any of the various electronic devices.

Electronic device 11 of content display system 10 includes: Electronic Device Hardware 19; OS & Device Driver Layer 18; Application Programmers Interface (API) Layer 16; and Content Adaptive Application 14. Web page 22 includes web content 26, and a VL in the form of tags 24. While web page 22 including web content 26 is used in the embodiment shown in FIG. 1, any content in any form may be used in combination with a VL including audio, video, database information, contacts, enterprise applications or any other type of content. The phrase "web content" is intended in the broadest sense and includes any content that may be transferred over a network and in particular over the Internet or world wide web (www).

In the embodiment of FIG. 1, electronic device 11 includes a content adaptive application 14. Each content adaptive application 14 is designed to work with a specific API Layer 16 of an electronic device 11. While in general terms each content adaptive application 14 is designed to work with a single platform, for example the iPhone® or the Blackberry® but not both, the content adaptive application may work with more than one platform where the platform shares a common or substantially common API. For example, the Android operating system has been ported to multiple platforms and a single content adaptive application may support all those platforms.

A content adaptive application 14 may be designed for each platform by sophisticated developers that are familiar with the platform and corresponding API Layer 16 along with development on that particular platform. Each content adaptive application 14 designed for each different electronic device platform, understands how to interpret the VL to display data natively on a particular device. The VL may be considered metadata that instructs the content adaptive application 14 about how to handle the data. The VL enables entities not familiar with development on all the various electronic device platforms to develop one VL for their content and display that content natively on all the devices that include a content adaptive application 14.

Preferably, the VL is programmed in a language that is widely known and easy to develop in. Even more preferably, the VL is in a language that will not affect display of the data in typical web browsers so that the VL may be included in existing web pages and web applications if desired. As shown in FIG. 1, web page 22 includes a VL in the form of tags 24. Tags 24 may be any type of text schema including HTML5 tags or XML to name a few. In one embodiment, custom tags—such as Bitzer HTML5 tags—may be created to work with a specific content adaptive application 14. In addition to tags, other general text schema may be used as the VL to classify or categorize the type of web content to be displayed.

In addition to text based schema, other methods of creating a VL may be used in other embodiments. For example, binary, hexadecimal, compiled or uncompiled instructions may be used. The VL may also be dynamic such that a portion of the instructions are received from the user in the form of gestures etc. For example, the user may shake their phone in one direction to format the data in one orientation and shake their phone in another direction to format the phone in yet a different format. In other embodiments, the data format may be based on: the location of the electronic device; proximity to other objects, devices, or persons; temperature; direction; speed; or any other host of dynamic parameters.

In order to allow the content adaptive application 14 to work with web pages and web content designed for display on a native web browser, the content adaptive application may use a series of rules to deal with portions of the web page or web content not abstracted by the VL. In a preferred embodiment, the content adaptive engine: ignores any HTML elements that are not native to the VL; does not load images or other media files unless they are explicitly marked by the VL; ignores Javascript; and ignores CSS. In other embodiments, other rules may be used to deal with portions of the web page or web content not abstracted by the VL. Other embodiments of the content adaptive engine 14 may also support other features.

One purpose of the VL is to abstract the web content 26 from the content adaptive application 14. By abstracting the web content 26 from the content adaptive application 14, a separate content adaptive application 14 may be developed for various different platforms. Each content adaptive application 14 is designed to allow a custom display of the web content 26 on the display of the its platform. Thus, the custom content display may be optimized for the display of the particular platform by the content adaptive application 14.

The content adaptive application 14 consumes the VL or in the embodiment shown in FIG. 1 the tags 24, and translates the data into templates. After retrieval of the tags 24 by the content adaptive application 14, each tag is programmatically processes to initiate preset functions to facilitate mapping the abstracted data to a native display. The content adaptive application 14 creates a working model consisting of UI templates, data, data display locations, authentication and other such features.

Figure 2A:
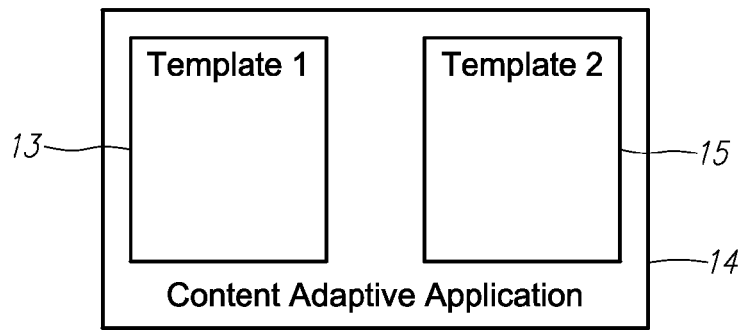
FIG. 2A illustrates a content adaptive application for use with the system of FIG. 1 and including a plurality of templates.

FIG. 2A illustrates a content adaptive application 14 for use with the system 10 of FIG. 1 and including a plurality of templates 13 and 15. Templates 13 and 15 are designed to display data on the display of a specific electronic device. Templates 13 and 15 may take into account the resolution of the device display, common user interface elements of the device, native look and feel, and other display or interface elements of the electronic device they are designed for. Only two templates 13 and 15 are shown in the content adaptive application 14 shown in FIG. 2A, however, other embodiments may have more than two templates. In a preferred embodiment, the content adaptive application 14 has a template that corresponds to all the commonly used data display formats on the electronic device.

Templates 13 and 15 are specifically designed for use with a particular electronic device platform. While generally this means that templates 13 and 15 are designed to be used with a single device, it is possible that the same templates may be used on more than one device. As explained above with respect to the content adaptive application generally, where more than one device is similar enough in display characteristics and/or user interface style, the same templates may be used for more than one electronic device.

Figure 2B:
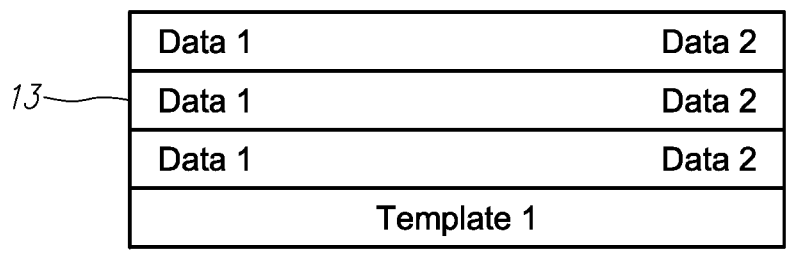
FIG. 2B illustrates an embodiment of a template from FIG. 2A.

In a preferred embodiment, each template on a device corresponds to a template style. A template style is a particular style of data display. For example, template 1 may be part of a template style that supports listing data rows from a database horizontally one below the other as shown in FIG. 2B. As one example of how template styles are used, each content adaptive application 14 may include a different template 1 that is customized for the corresponding display of the electronic device the content adaptive application was designed for. However, each template 1 conforms to the style of listing data rows one below the other. Consequently, when the VL requires data rows to be displayed one below the other, the VL can specify template 1 and achieve a customize view of the data across multiple platforms that conforms to a particular style. To this end, in a preferred embodiment, a particular template number or designation conforms to the same template style as the corresponding template with the same number or designation but which was designed to work with a different electronic device platform.

FIG. 2B illustrates an embodiment of template 13 from FIG. 2A. Template 13 is just one embodiment of a template and numerous other template designs are possible. As may be seen in the embodiment of the template 13 shown in FIG. 2B, template 13 displays Data 1 and Data 2 on the same line in a list format. Data 1 and Data 2 are examples of data abstraction categories.

In a preferred embodiment, a plurality of different template styles are designed and a template specific to each supported platform is implemented within the respective content adaptive application to support the specific template style. However in other embodiments, templates may be pushed or dynamically loaded into existing content adaptive applications. In embodiments that allow pushing or dynamically loading templates, the content adaptive application may include a template abstraction layer to abstract the template designs and allow templates to be pushed to the various content adaptive applications after applications are installed and in use. Dynamically loading templates allows new template styles or new template designs to be supported without having to install a new content adaptive application with additional or modified templates on each electronic device.

Figure 2C:
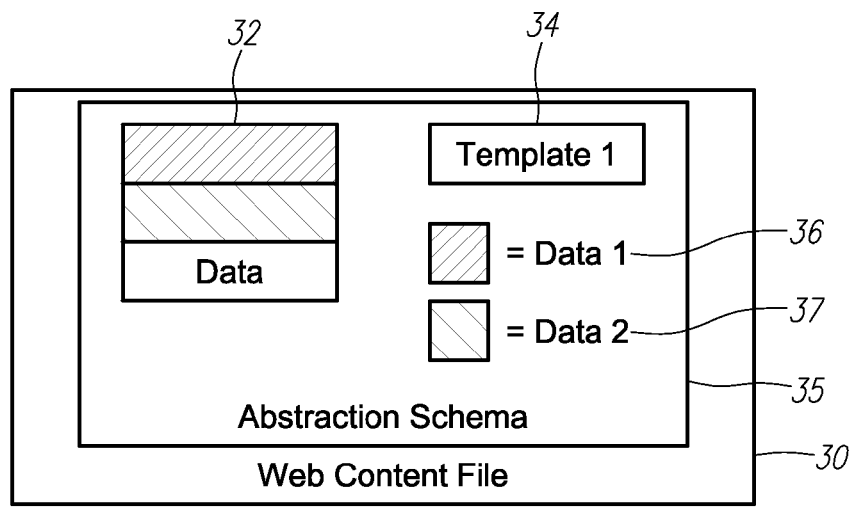
FIG. 2C illustrates a web content file for use with the content adaptive application of FIG. 2A.

FIG. 2C illustrates a web content file 30 for use with the content adaptive application 14 of FIG. 2A. Web content file 30 includes a virtualization layer 35 that abstracts data 32 into categories. In the embodiment shown in FIG. 2C, one portion of the data is abstracted into category "data 1" 36 and another portion of the data is abstracted into category "data 2" 37. In other embodiments, other more complicated VLs 35 may be used.

Virtualization layer 35 also includes format information 34. Format information 34 provides content adaptive application 14 with information about how to format the abstracted data. In a preferred embodiment, format information 34 specifies what template the content adaptive application 14 should use to display the abstracted data 34.

Although the embodiment shown in FIG. 2C illustrates data 32 as part of the web content file 30, in other embodiments web content file 30 may simply include information about a data source and the data, or a portion of the data, may be located external to the web content file 30. For example, the data may reside on a server located on a network and the web content file 30 may include a reference to the location of the data on the server such as a Universal Resource Locator (URL), database or other data repositories.

In different embodiments, web content file 30 may come in various different forms. In one embodiment, web content file is in the form of a web page. In such an embodiment, the abstraction schema may be HTML tags so that the web page is compatible with a typical browser yet may be interpreted by content adaptive application 14 and displayed on various electronic devices in a format native to the device. In other embodiments, web content file 30 may be a stand alone file not meant to be rendered as a web page but including the VL 35. In various embodiments, different types of data files may be used for web content file 30 including text files, Microsoft Word, Hypertext markup language HTML, JSON, ATOM, XML or other web or non-web based file formats to name a few. As used herein, "web content file" is any file designed to work with a content adaptive application 14 to facilitate the display of web content, or any file that includes web content or points to or is linked to web content.

In some embodiments, web content file 30 may be loaded on the electronic device 11 as part of the content adaptive application 14. In such an embodiment, web content file 30 may act like a bookmark for web content. In other embodiments, web content file 30 may be located on a web server or other location and interpreted dynamically. Although only a single web content file 30 is shown, the content adaptive application 14 is designed to interpret an unlimited number of different web content files 30. In addition, more than one web content file 30 may be associated with a single web application. Using more than one web content file 30 to define a single application can help developers organize their development efforts more easily. Where more than one web content file 30 is used for a single application, all such files may be located in a single directory or located in some other pre-established file system. The file system structure should be known or made known to the content adaptive application 14.

The web content file shown in FIG. 2A, and used with content adaptive application 14, is platform independent. Developers only need to create one web content file 30 (or set of files) for any particular application. A single web content file works across multiple platforms and allows the web content to be displayed in a native format on any electronic device that is running a content adaptive application 14.

The web content file 30 includes the VL 35 which provides information to the content adaptive application 14 about how to handle or format the various categories of data abstracted by the VL 35. However, the web content file may contain information other than the VL in order for it to interface with other applications. Preferably, the web content file 30 is written in a schema that is easy to use and well known such as HTML5 or XML. This allows developers to easily create custom applications for multiple various platforms with one instantiation of the web content file 30.

Figure 3A:
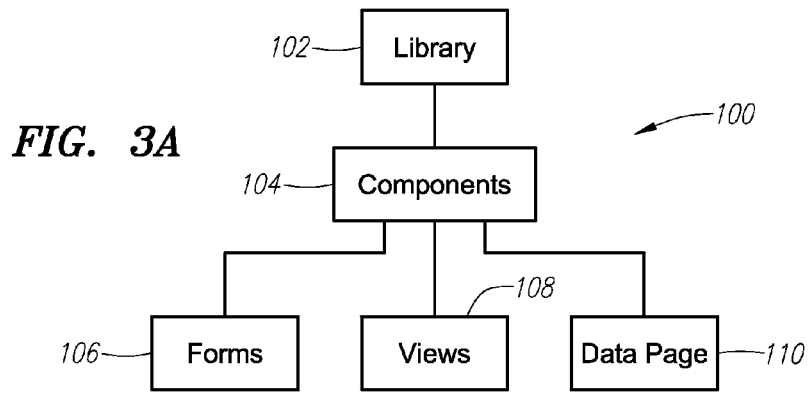
FIG. 3A illustrates one embodiment of a virtualization layer that includes multiple layers.

Although in FIGS. 2A-2C the VL is described as a single layer that abstracts data and maps it into templates, the virtualization layer VL may be comprised of more complicated data structures and may in fact be more than one layer. The VL may map the abstracted data into more than just templates and may map data into various structures. FIG. 3A illustrates a VL 100 including a library 102, components 104, forms 106, views 108, and data page 110.

The embodiment of the VL shown in FIG. 3A contains multiple layers. The VL 100 shown in FIG. 3A is designed to allow a standalone VL 100 to be developed. The standalone VL works alongside existing web applications so that no modification of existing web application code or pages is required. In other embodiments, the VL may be integrated with the existing web page.

In the embodiment shown in FIG. 3A, the top level of the VL is the library 102. Each web application that is available to a content adaptive application 14 includes a library file 102. Each library 102 provides a library web page as the entry point into the web application. This library page acts as a table of contents for the entire web application. The content adaptive application uses this library page to determine various artifacts it needs to import from the web application.

In a preferred embodiment, the library 102 contains a list of all the components 104. Each component 104 contains a list of forms 106, views 108 and links to its data page 110. A component 104 corresponds to any information or business entity that is to be exposed through the content adaptive application 14. In the embodiment of the VL of FIG. 3A, any fields from the web application or web service, or columns from a database that need to be exposed to the content adaptive application 14 are defined as a component 104. In a preferred embodiment, HTML forms are used to define the components 104.

In a web application, forms provide the ability to interact and modify data. Similarly, the VL maps data that needs to be manipulated into forms that may be displayed natively on each platform. For each component that needs to be updated, a default form is created. Forms are just one example of a template and various different forms may be used to modify data. In a preferred embodiment, forms are designed to work with a single record.

In addition to the ability to modify the data of a single record, the data of multiple records may need to be displayed. Similar to forms, views are another type of template. The same data may be viewed using different views. The view may be a simple list, a list that shows more than one column on each row, data shown on a map, data shown on charts and graphs, or any other type of format. In a preferred embodiment views are used with data sets that include multiple records.

The data page 110 defines the data that needs to be displayed either in a template such as the forms 106 or the views 108 for each component 104. The data page handles: downloading data and storing it locally when the data is located on a remote source (offline mode); downloading changed data for offline mode to keep it up to date; sending changed data back to the remote source; accessing remotely stored data (online mode); and searching for data remotely stored for online mode. Views may be set to work in either online or offline mode.

In some embodiments, both offline mode and online mode may be used in combination or separately to control data access. Online mode requires refreshing and fetching the data with each access; off-line mode pulls the data from the web service and stores the data in a local cache for interaction by the mobile user and then synchronizes the data with the web service on predetermined or manual intervals. Other forms of data retrieval may be used in other embodiments.

In different embodiments, the data may be mapped into the data page in numerous different formats. In a preferred embodiment, the data is mapped into the data page as an HTML <table> element. The first row of the table defines fields present in the component 104. Each first row cell corresponds to a field of the component 104. Each subsequent row of the table represents a row containing data. Each cell in a data row represents data for a field.

The data page 110 represents the data that will be mapped into the forms 106 and views 108 and will eventually be part of the content adaptive application 14. The data page 110 allows a subset of the full web application data to be defined for use with the content adaptive application 14. This is often preferred because of the small displays of many mobile electronic devices.

Figure 3B:
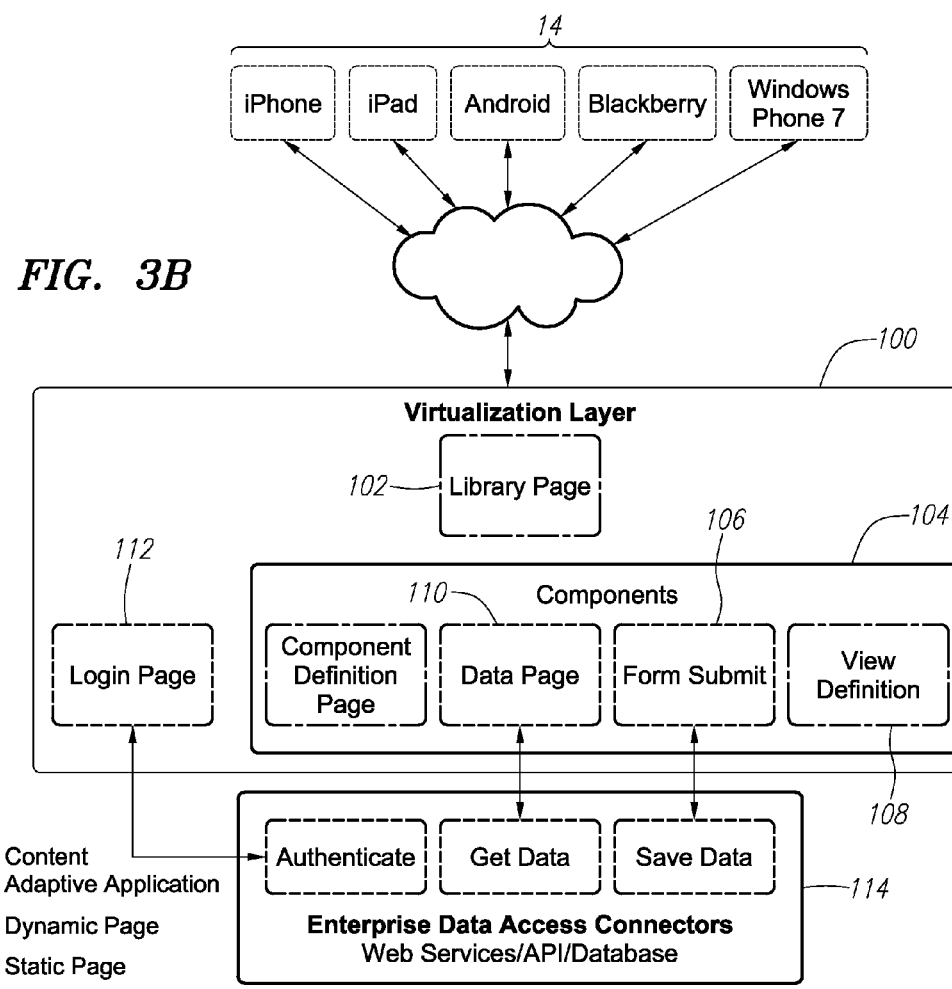
FIG. 3B illustrates the virtualization layer of FIG. 3A interacting with a web application.

FIG. 3B illustrates the VL 100 of FIG. 3A interacting with a web application 114. In FIG. 3B the data page 110 retrieves all the data required by the various components 104 in the library 102. Data that is updated or modified is handled by the forms 106. Data consisting of multiple records is handled by the view module 108. In the embodiment shown in FIG. 3B, the existing enterprise application 114 is connecting to a virtualization layer 100. The VL is consumed by the content adaptive applications 14 deployed as native applications on the mobile devices. Content adaptive applications 14 are available on multiple devices, thus enabling multi-platform support with one single VL development.

As shown in FIG. 3B, the content adaptive application 14 may also deal with user authentication through a login page 112 in the VL 100. In a preferred embodiment, the content adaptive application 14 uses the HTML forms based login page of web application to gain secure access to enterprise data. When a username and password are specified for a library they are passed to the login page to authenticate and gain access to components, forms, views and data.

The content adaptive application 14 may utilize any access restrictions implemented by the web application. If access needs to be restricted for a user or groups of users it may be implemented by the web application. When the content adaptive application 14 logs in through the VL, the content adaptive application 14 sees only components, forms, views and data the user is allowed to see.

In a preferred embodiment, the login URL, username, and password are provided by the user when a library is manually registered. In a preferred embodiment, the password is stored encrypted. However, in other embodiments the password may not be encrypted. Also in a preferred embodiment, session cookies set by the web application are maintained by the content adaptive application 14 and stored encrypted. This allows the content adaptive application to emulate a session with a web application without the user needing to login every time. In some embodiments and preferably, if a session times out, the content adaptive application logs in again without user intervention.

FIG. 4 illustrates one example of a web content file 30 including a VL that uses tags. FIG. 4 illustrates one example of how tags may be: 1) embedded into a webpage, web application, presentation layer, mobile focused shim layer webpage or electronic file with network connectivity; and 2) constructed using data-type. The tags used in FIG. 4 are custom tags such as Bitzer tags but any type of tag or schema may be used to form a VL around the web content 26.

In the embodiment shown in FIG. 4 and preferably, the tags are used to abstract the web content 26 by type. As may be seen, the data is categorized into various types such as: label; short label; type; help-text; and display-group-name. Abstracting the content using data-type enables HTML5 compliance and smooth error-free interoperability with web browsers and other devices that may read tags 24 from the hosted site. In other embodiments however, other abstraction schema are possible including abstracting the content into generic categories or other abstraction schemas.

Returning to FIG. 1, the process of how tags are transported to the electronic device 11 is illustrated for a VL that is included as part of the webpage. The tags travel to both the web browser 21 as part of the web page 22 and also to the electronic device 11. The data may be transferred between the web server 30 over numerous types of protocols including standard and non-standard communication protocols. In a preferred embodiment, the data is transferred between the web server 30 and the web browser 21 or electronic device 11 using the HTTP protocol. In a preferred embodiment, the data is transferred using a secure connection, like HTTPS, with or without client side certificates. However in other embodiments, an unsecured connection may be used. If a secure connection is used, HTTPS may be used, however in other embodiments, other protocols may be used.

Figure 5:
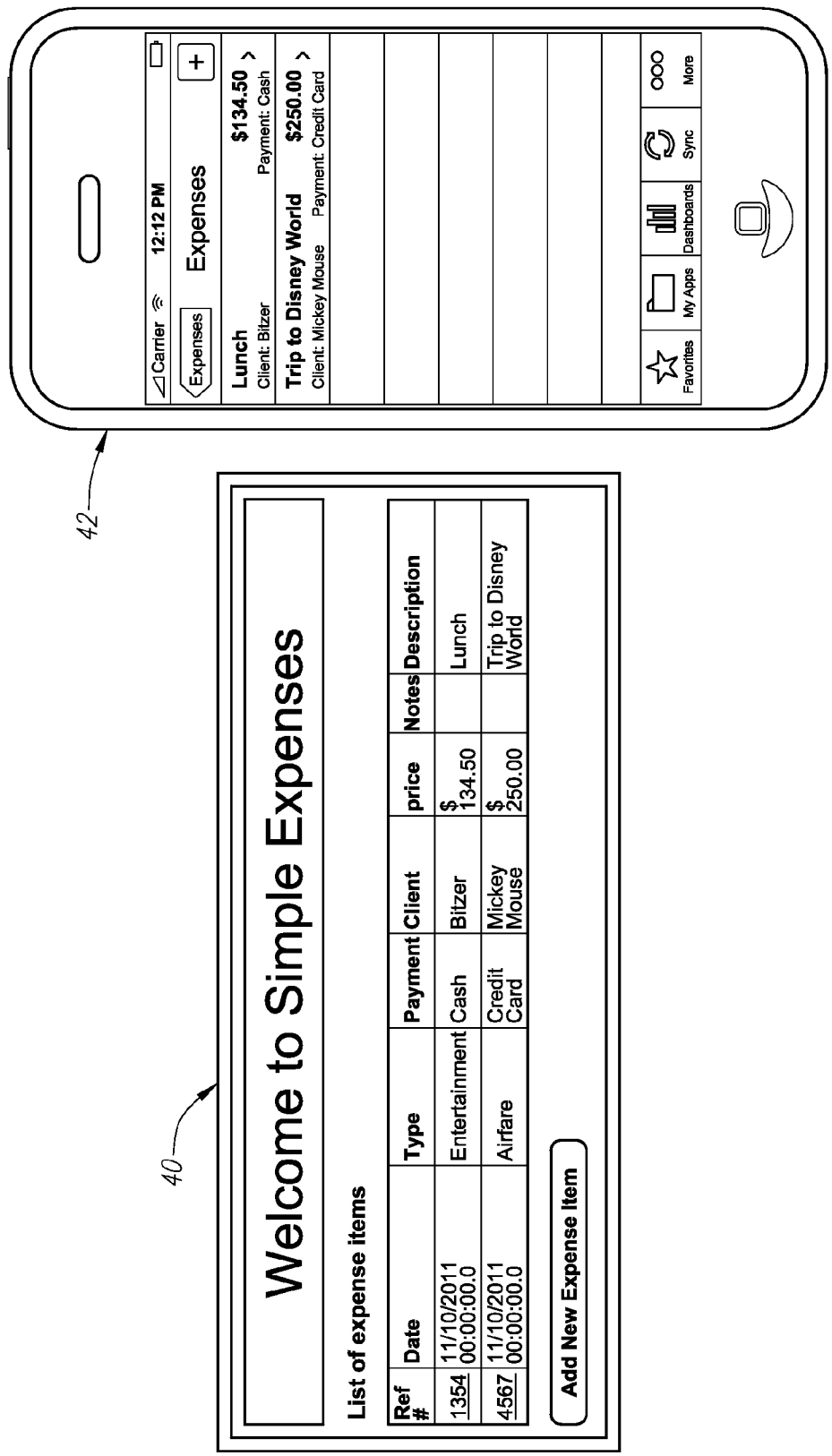
FIG. 5 illustrates an example of how web content may be displayed on both a web application and an electronic device.

FIG. 5 illustrates an example of how a web content file may be displayed on both a web browser 40 and an electronic device 42. As may be seen, all the data displayed in the web browser 40 is not displayed on the display of the electronic device 42. As may also be seen, the web content is displayed in a native format specific to the electronic device 42. As explained above, the VL associated with the web content file would abstract the data. The data would then be mapped into a template that would display the data on the electronic device as shown in FIG. 5.

In the embodiment shown in FIG. 5, the data is broken up into description, notes, price, client, payment, type, date and reference number. The VL instructs how to handle the various data types and what to display. In the embodiment shown in FIG. 5, the VL instructs the content adaptive application to select a template that shows the data in rows. The VL then maps the actual data to the fields of the rows of the template. In the embodiment shown, each entry only shows the description and price with the client and payment information below. Once the data is mapped and formatted, the content adaptive application 14 calls the API Layer functions to correctly display the abstracted data in the format instructed on the particular platform.

Although only a single electronic device is shown in FIG. 5, the same web content file that is used in FIG. 5 to display the data on a web browser 40 and also on the electronic device 42 may be used to natively display the information on additional electronic devices with different display characteristics from the electronic device 42. The content adaptive application running on each of the additional devices would map the data to the respective template specified. The template of each content adaptive application is designed to show the data in a format native to the electronic device it resides on.

FIG. 6 illustrates how a web application input form may be displayed in a web browser 50 and displayed in a native format on an electronic device 52. Similar to the data displayed in FIG. 5, the input form and associated data is abstracted by the VL. The VL sets the format for the abstracted data by selecting a template. Once the VL is consumed and the data is mapped, the content adaptive application 14 uses the API Layer to display the template and associated data in a format native to the electronic device 52.

In the embodiment shown in FIG. 6, the data is originally displayed in a view that is not editable. However, in the upper right hand corner of the screen is an edit button. If a user presses the edit button the data becomes editable by the user. Any changes with the data are sent to the web application for update.

The manipulation of the data from not editable to editable and from one view to the next is called the workflow. In addition to specifying the original template the data is mapped into, the VL may also specify the workflow. For example, when the user selects the edit button in FIG. 6, the VL might specify that the data is editable in place. However, in another embodiment, selecting the edit button may only highlight the information for editing. When a user selects the highlighted data to be edited, a new view or screen appears that shows only the details of that particular record. On this single record screen the user may edit the data. These are just a couple of examples of different workflows that may be specified by the VL and in other embodiments, numerous other workflows may be used.

Figure 7:
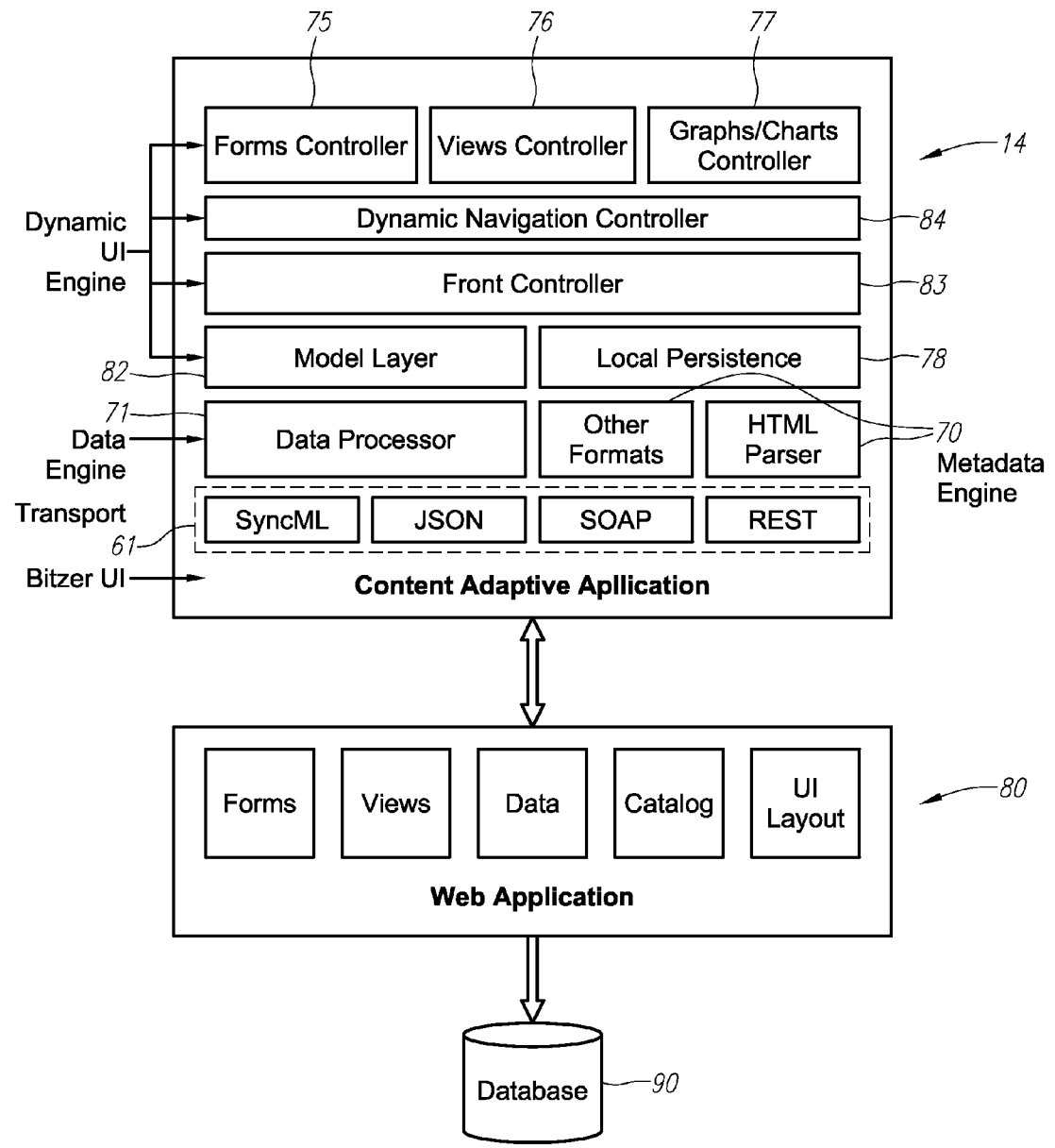
FIG. 7 illustrates the software components of one embodiment of a content adaptive application.

FIG. 7 illustrates the software components of one embodiment of a content adaptive application 14. In addition, FIG. 7 also shows the basic components of a typical web application 80 that may be interpreted by the content adaptive application 14. The web application 80 consists of a presentation layer that includes forms, views, data, catalog, and user interface layout elements. The web application 80 also includes business logic associated with the application. Web application 80 resides on a network server and may include or be in communication with a database backend 90.

The content adaptive application 14 runs as a native application on the mobile or computer platform. FIG. 7 represents just one embodiment of the content adaptive application 14 and in other embodiments, more or less components are possible. The components of the content adaptive application 14 embodied in FIG. 7 will now be discussed.

The content adaptive application 14 includes a data transport layer 61. The data transport layer 61 deals with communicating and updating the data used by the content adaptive application 14. For example, the transport layer would work with the data page 110 of the VL in FIGS. 3A and 3B to make sure the data is updated and/or synced.

In different embodiments, the data transport layer 61 may include many various components. In the embodiment shown in FIG. 7, the data transport layer 61 includes a Synchronization Markup Language (SyncML) module 63, JavaScript Object Notation (JSON) module 65, and Simple Object Access Protocol (SOAP) module 67 and a Representational State Transfer (REST) module 69. These various modules provide the content adaptive application 14 the ability to communicate with various different web applications 80 and send, receive and sync data with the web applications 80.

In the embodiment shown in FIG. 7 and preferably, the content adaptive application 14 communicates data and receives data to display by using networking protocols like IP, TCP, SSL, IPsec. In other embodiments, different protocols or different combinations of protocols may be used.

In a preferred embodiment, the content adaptive application 14 supports parsing HTML and HTML tags. Parsing and translating tags may also be referred to as the process of reading tags. Tags may be used by the VL to abstract the data and are consumed by the content adaptive application when rendering a webpage, web service or other content.

When the web content is received, the format is consumed to obtain the data. For example, if the web content is in a HTML format, the HTML parser 70 would parse the web content and extract the data including the tagged information. Content adaptive application 14 may include other parsing modules 70 to allow parsing other formats. The data is processed with data engine 71 and mapped into templates for display.

The templates may be categorized into various basic types such as forms, views, graphs and charts, and other template types including but not limited to real-time camera views, augmented reality using camera views, and 2D/3D graphically views. As may be seen in the embodiment shown in FIG. 7, various template controller modules 75, 76 and 77 may be dedicated to handling the various different categories of templates.

The content adaptive application 14 processes the tags to specify views, form types, data and form relationships, and workflows using the Dynamic UI Engine. In the embodiment shown in FIG. 7, the dynamic UI Engine consists of the Model Layer 82, the Front Controller 83, the Dynamic Navigation Controller 84 and the template controllers 75, 76, and 77. The look and feel of the views, forms and data may be specified. Elements such as color, number of rows, logo, images, icons and other available UI elements may be specified.

In the embodiment shown in FIG. 7, the model layer 82 is the brains of the VL. The model layer 82 processes the metadata to instruct the view layer on the correct template(s) and workflows. The model layer handles the parent/child relationships of the data and services the view layer.

The embodiment shown in FIG. 7 also includes a Front Controller 83 and a Dynamic Navigation Controller 84. The Front Controller 83 is responsible for interacting the API of the device to render the data to the screen. The Dynamic navigation controller 84 accepts and monitors user input and instructs the content adaptive application 14 accordingly. User input may be from a touch screen, a button, input from a motion or light sensor, input from a gyro, or any other type of input.

In addition to actual data, processing and workflows the VL may also be used to specify other information. For example, the tags may be parsed to instruct the content adaptive application to perform various functions such as user authentication or data retrieval or sync from a remote source. In other embodiments, other commands may be supported by content adaptive application 14.

In some embodiments, the tags may be parsed to reveal that the content adaptive application 14 needs to request additional data from another source. The type, form, and retrieval method may be pre-specified by the tags. For example, the data retrieval may follow an off-line or online method as previously explained. In some embodiments, the content adaptive application 14 may subsequently connect to a web server, database, or other source of information to retrieve additional data or sync additional data.

In the embodiment shown in FIG. 7, Local Persistence module 78 handles authentication and security. In some embodiments, content adaptive application 14 may provide security or authentication for the connection with web application 80. For example, content adaptive application 14 may process tags to provide user persistent onetime authentication and role based access control so the electronic device users only see views, forms and data intended for their specific username and password. The VL may be used to authenticate client and server relationships using standards such as tokens, SSL, PKI, SMS with validity codes, or other secure connection means.

As explained herein, one purpose of content adaptive application 14 is to allow developers to create platform independent web content files that work in combination with the content adaptive application 14 to allow web content to be displayed in a format native to a number of various electronic devices. To this end, the content adaptive application 14 may process the VL in the web content file to enable interaction between the electronic device and the electronic device user using the specific features native to the electronic device. For example, the content adaptive application 14 may incorporate the UI elements parsed from the VL to take advantage of a touch screen, voice recognition, GPS for location awareness, motion sensors for gestures and other such features available on the specific electronic device.

In addition to interacting with the hardware of the electronic device, the content adaptive application 14 may process the VL to interact with other hardware attached to the electronic device. The other hardware may be accessible via programmable interfaces or other interfaces. Types of other hardware that may be controlled include tethered devices, sensors, monitors, computers, transmitters, receivers and other pluggable devices.

An example of how to implement an embodiment of a system for providing access to existing web applications using a content adaptive application 14 will now be discussed. The process explained is just one embodiment and other embodiments may vary significantly. The process described below is given as an example to illustrate one of the many ways companies may use a VL and related application technology to offer web application access on electronic devices.

Step 1, a company first analyzes and decides on how to restructure the presentation layer of their current web applications for mobile consumption. This restructuring is typically done by product managers and business IT managers to increase efficiency and increase return on investment (ROI). The result of restructuring typically results in reducing the number of fields available on a smaller mobile device screen, segments larger functionality into smaller workflows and components to account for limited screen size, and incorporates custom input capabilities such as a touch screen interface. In addition, the restructuring may also integrate mobile device specific features like location awareness, user specificity, motion sensors for gestures, voice recognition and other features into the application.

Step 2, the company uses the analysis of step 1 to integrate or build a separate mobile device presentation layer with a VL such as tags or some other schema. Should the company wish to take advantage of the Bitzer mobile applications it may use Bitzer HTML5 Tags. This may also be known as a "Bitzerized page." In a preferred embodiments, the VL will define the views, forms, data and related functionality that are to be provided to the electronic device user.

If the company chooses to use Bitzer tags, the company may use the Bitzer HTML5 Tag specification available from Bitzer Mobile Inc. which is herein incorporated by reference. The specification provides technical details so developers may implement the Bitzer HTML5 tags.

Step 3, mobile device users will download and install a content adaptive application to their electronic device. One example of such an application is the Bitzer Mobile Application (BMA). The content adaptive application may be distributed using standard distribution methods like the Apple App Store®, Android Market®, or dedicated enterprise provisioning of pre-loaded schemes. When the content adaptive application is directed to a web page or other web content including a VL, the content adaptive application will parse the VL and display the information in a format native to the device.

The content adaptive application may be navigated to a web page or web content containing a VL by entering a standard URL or network address. In some embodiments, the content adaptive application may be preloaded with networking locations of web pages or web content that contain a VL. In other embodiments, web pages or web content containing a VL or another abstraction schema may be hard-coded or pre-loaded into the mobile application. In yet other embodiments, the electronic device application may be limited to only specific web pages and web content.

In a preferred embodiment, a company may also create platform independent web content files. These files, also known as libraries, may be dynamically loaded by the content adaptive application to allow the content adaptive application to work with various web applications and web data. In some embodiments, the libraries may not be designed to be displayed both on a conventional web browser and a content adaptive application and may be specifically designed for use with content adaptive applications. In other embodiments, the libraries may be designed to be displayed on either a web browser and a content adaptive application or both. Although libraries may not be designed to be displayed by a conventional web browser they may still be programmed using HTML or other similar languages. In other embodiments, the information contained in the library may be statically included in the content adaptive application.

In addition to allowing web content and data to be more easily displayed on multiple platforms, the content adaptive application may provide other benefits. In some embodiments, the content adaptive application may further include a virtual application container to provide a way to access, consolidate and provide security for multiple applications. More specifically, the virtual application container may embody application data and GUIs for the purpose of isolation, consolidation, security and management of such applications and data from others on the same device.

In a preferred embodiment, the virtual application container is used as part of a content adaptive application. However in other embodiments, the virtual application container may be used in other types of device applications and the virtual application container is not limited to use with a content adaptive application.

Figure 8:
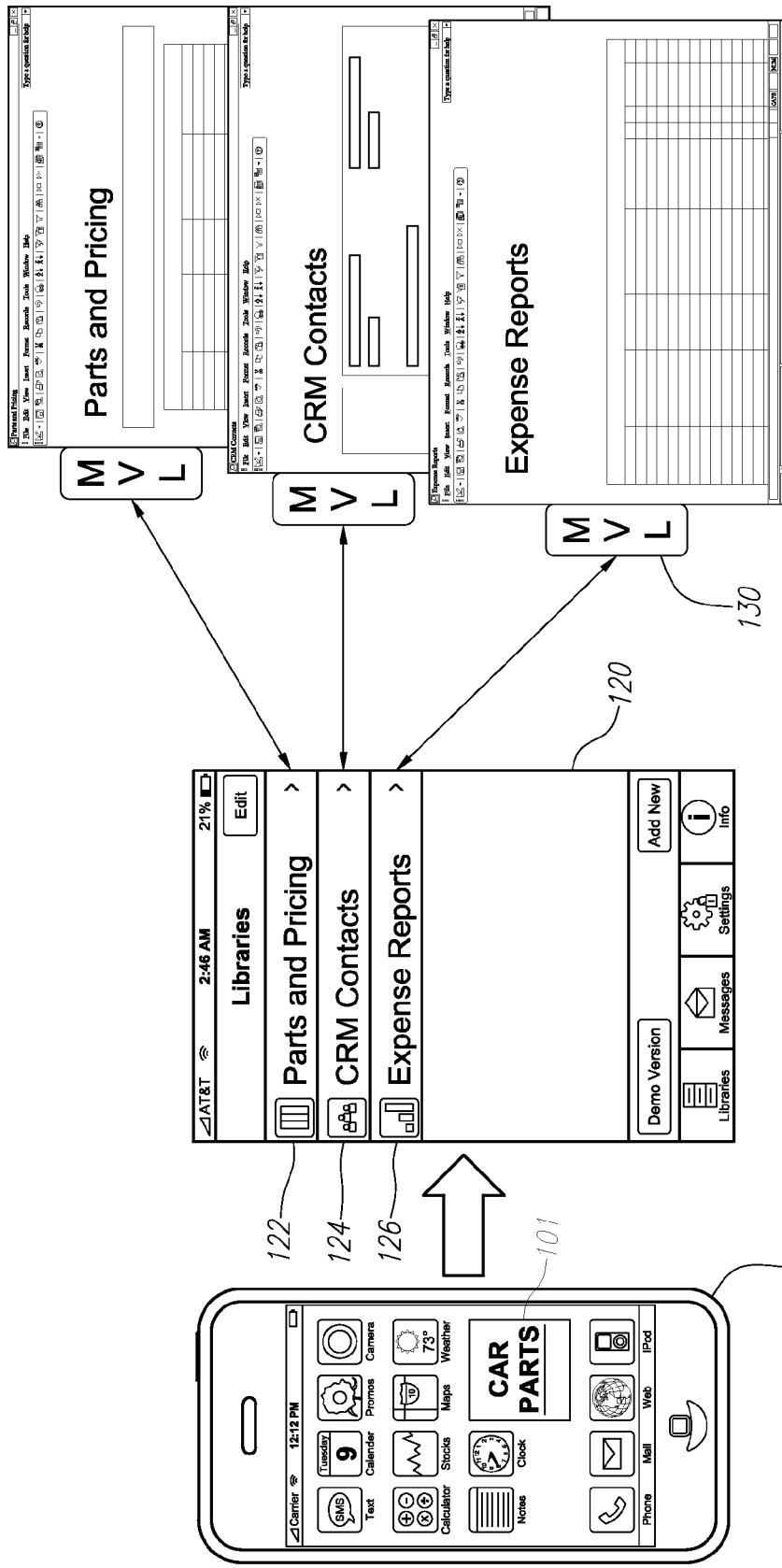
FIG. 8 illustrates a content adaptive application existing as a single native application on an electronic device and including multiple other applications.

FIG. 8 illustrates how a content adaptive application may include a virtual application container. In the embodiment shown in FIG. 8, the content adaptive application is expressed as a single application icon 101 on a mobile device 102. The content adaptive application is expressed as a "Car Parts" logo and includes a virtual application container. When the logo is touched the content adaptive application opens the virtual application container 120.

Inside the virtual application container 120 there are three (3) separate applications that are accessible: Parts and Pricing 122; CRM Contacts 124; and Expense reports 126. In embodiments where the virtual application container 120 resides inside a content adaptive application, the enterprise applications 140 may include a VL 130 or some other schema to abstract the data. The content adaptive application may then interact with the data from the enterprise applications 140 by parsing the VL 130 and displaying the data, forms and other information in a format native to the electronic devise as described above.

In a preferred embodiment, applications in the virtual application container 120 are driven by a VL 130. The VL 130 allows the enterprise application data to be displayed in a format native to the electronic device as explained above.

In some embodiments, the applications 122, 124, and 126 may be established inside the virtual container 120 by statically programming them within the content adaptive application 200. However, in a preferred embodiment, the applications 122, 124, and 126 are established by dynamically loading a library or web content file. Even more preferably the library or web content file is a platform independent.

Figure 9:
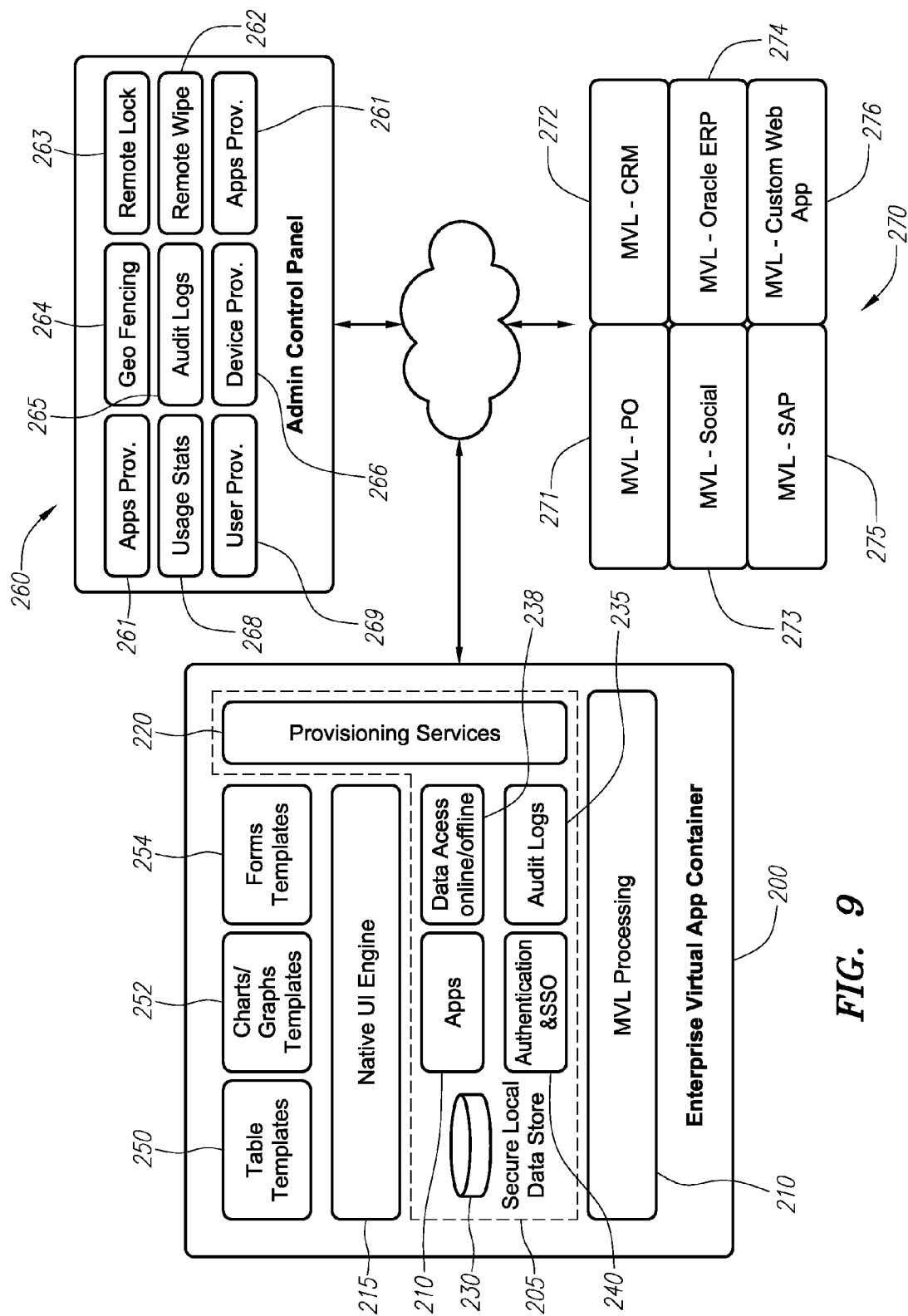
FIG. 9 illustrates an architecture of one embodiment of a content adaptive application including a virtual application container.

FIG. 9 illustrates an architecture of one embodiment of a content adaptive application 200 including a virtual application container 205. As explained above, the application 205 including the virtual container 205 is embodied as a native application written for a particular mobile device using the software development kit (SDK) provided by the mobile device manufacturer or OS provider. The embodiment of the virtual application container 205 shown in FIG. 9 includes a secure local data storage 230, applications 210 (which may be dynamically loaded as platform independent libraries), authentication and SSO 240, audit logs 235, and data access 238.

In a preferred embodiment, the virtual application container 205 also includes a service provisioning module 220. The service provisioning module 220 allows control, monitoring and access to the data and applications inside the virtual application container 205 via remote access from an administrator. In a preferred embodiment, service provisioning module 220 communicates with a central management system, such as admin control panel 260, to provide IT staff, administrators and individuals with control of the virtual application container 205.

In a preferred embodiment, admin control panel 260 is a centrally managed provisioning portal that is hosted in the cloud or on-premise. In various different embodiments, any number of control functions may be allowed through service provisioning module 220. As shown in the embodiment of FIG. 9, admin control panel 260 includes: Application provisioning 261; Remote wipe 262; Remote Lock 263; Geographic Fencing 264; Audit Logs 265; Device Provisioning 266; Usage Statistics 268; and User Provisioning 269. Other embodiments may include other administrative controls.

The applications and data located within the virtual container 205 may be monitored and controlled by the virtual container 205. This may be done locally or remotely. In some embodiments, the virtual container 205 may support the ability to remotely add new libraries, or refresh or delete existing libraries. In other embodiments, the virtual container may support the ability to wipe the contents of the container, both libraries/applications and associated data. In yet other embodiments, the virtual container may support the ability to lock or unlock the container or only lock access to particular applications or data. This total or partial locking may be based on any number of factors including geographic location, time, usage policies or any other criteria.

In a preferred embodiment, the virtual container 205 provides secure encapsulation of data and remote management capabilities of just the container instead of the entire device.

The controls of the admin control panel interface with the content adaptive application 200 and the virtual application container 205 through the service provisioning module 220. In some embodiments, service provisioning module 220 allows an administrator to set rules or multiple rules to monitor the use of the content adaptive application 200 and associated virtual application container 205 and provide various security and usage policies. For example, an administrator may set a rule to check a notification flag if the application 200 is used during an unauthorized time, for example between 1 a.m. and 3 a.m. If such a use occurs, the service provisioning module 220 documents the use in the audit logs 235 and sets a flag on the admin control panel 260 to notify the administrator. In various embodiments, numerous other rules or sets of rules to form advanced logic may be implemented and used by the service provisional module 220. In some embodiments, role based administration may be used.

In a preferred embodiment, the content adaptive application 200 may be instructed to wake on periodic intervals to assess the rules instantiated in the service provisioning module 220. Based on a direct command by the administrator from the admin control panel 260 or based on the requirements of a rule being satisfied, the service provisioning module 220 may provide remote wipe, disable specific functionality based on time of day, monitor a username, monitor geographic location, monitor number of attempts, log statistics such as applications visited, monitor duration spent in each application, monitor access times or any other provisioning function.

In some embodiments, the virtual application container may also include a secure local database 230. The local database 230 provides isolation of the virtual application container's 205 data from other data on the device. The secure local database may be a memory allocation on the flash or other local storage of the device to store information associated with the applications 210 located within the virtual application container 205. In a preferred embodiment, the secure local database consists of data stored in an encrypted format on the local device. In some embodiments, the encryption key(s) for the secure local database 230 may be created and hosted remotely to provide an additional level of security. The secure local database 230 may be deleted or locked remotely by the administrator through the service provisioning module 220.

The VL processing module 210 consumes the tags or other schema of the web application or web page to create a model of the application workflow and map VL identified sources to selected native user interactive templates 250, 252, and 254. The VL processing is assisted by the specific application platform independent libraries 270 associated with the web application. As explained above, the platform independent libraries 270 may be statically or dynamically included in the content adaptive application 200. In the embodiment of FIG. 9, the six (6) platform independent libraries are shown 271, 272, 273, 274, 275, 276. Each platform independent library may be separately dynamically loaded by the content adaptive application. Once the platform independent library is loaded, it assists the VL in mapping the VL identified sources to selected native user interactive templates 250, 252 and 254 and defines workflows.

Native templates 250, 252 and 254 are used to display, interact and input data in a format that is native to the mobile device. Although only three interactive templates are shown, table templates 250, charts/graphs templates 252, and forms templates 254, other embodiments may include more or less templates.

The native UI engine 215 handles consumption of the VL and mapping the data to the templates and processing the workflows.

In the embodiment shown in FIG. 9, and preferably, the virtual application container 205 includes an authentication and secure sign on (SSO) module 240. Authentication and SSO 240 manages authentication of access to the virtual application container 205. Various embodiments of the Authentication and SSO module 240 may support multiple different authentication and sign on methods including single sign-on. In a preferred embodiment, authentication and SSO module 240 also manages the different usernames and passwords and the respective access for each VL.

Although applications that are not content adaptive may include a virtual application container 205, including a VL 270 allows the application to use native user interface elements and features of the device such as multitouch, GPS, gestures and other features native to the device. The VL 270 may also allow developers to create platform independent libraries to support new applications quickly and easily.

Figure 10:
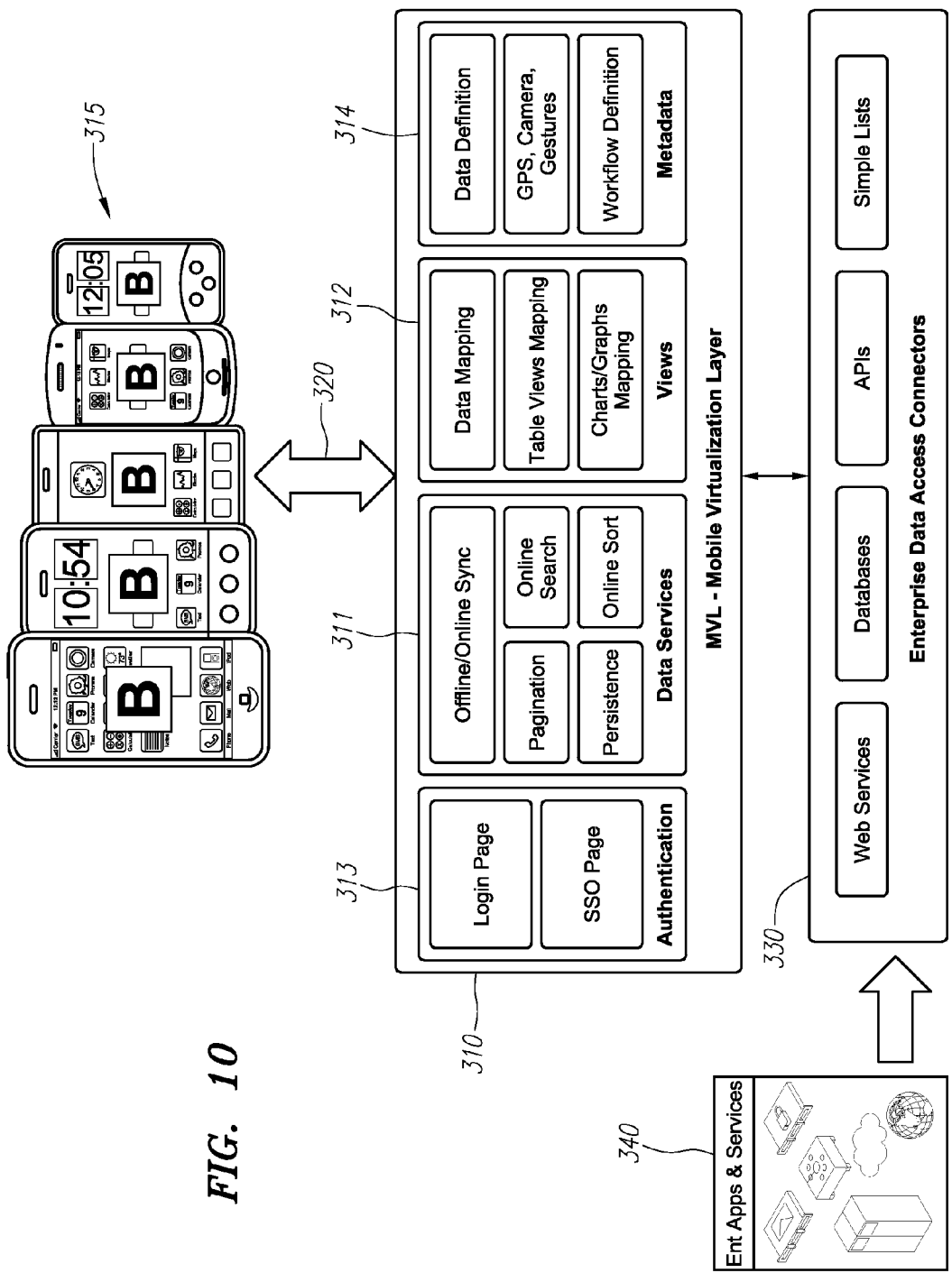
FIG. 10 illustrates one embodiment of a virtualization layer interacting with a mobile device and enterprise applications and services.

FIG. 10 illustrates one embodiment of a virtualization layer 310 specifically designed for a mobile platform, also known as a mobile virtualization layer (MVL), interacting with multiple electronic devices 320 and enterprise applications 340. In the embodiment shown in FIG. 10, the MVL 310 consists of multiple data handling functions such as offline sync 311, data mapping 312, authentication 313 and data definition 314. The MVL 310 may be accessed by content adaptive application and/or virtual containers through standard web connectivity 320. The MVL gathers data using data connectors such as API's, web-services 330 from existing enterprise servers 340 hosting existing applications, data sources, and business logic etc.

Providing an application including a virtual application container with the ability to use a VL 300 gives customers the ability to support multiple platforms with one VL 300 development while keeping their data and applications secure. Virtual containers on different devices may use the same VL 300 but display data in different formats to match the native look and feel of the host device.

Figure 11:
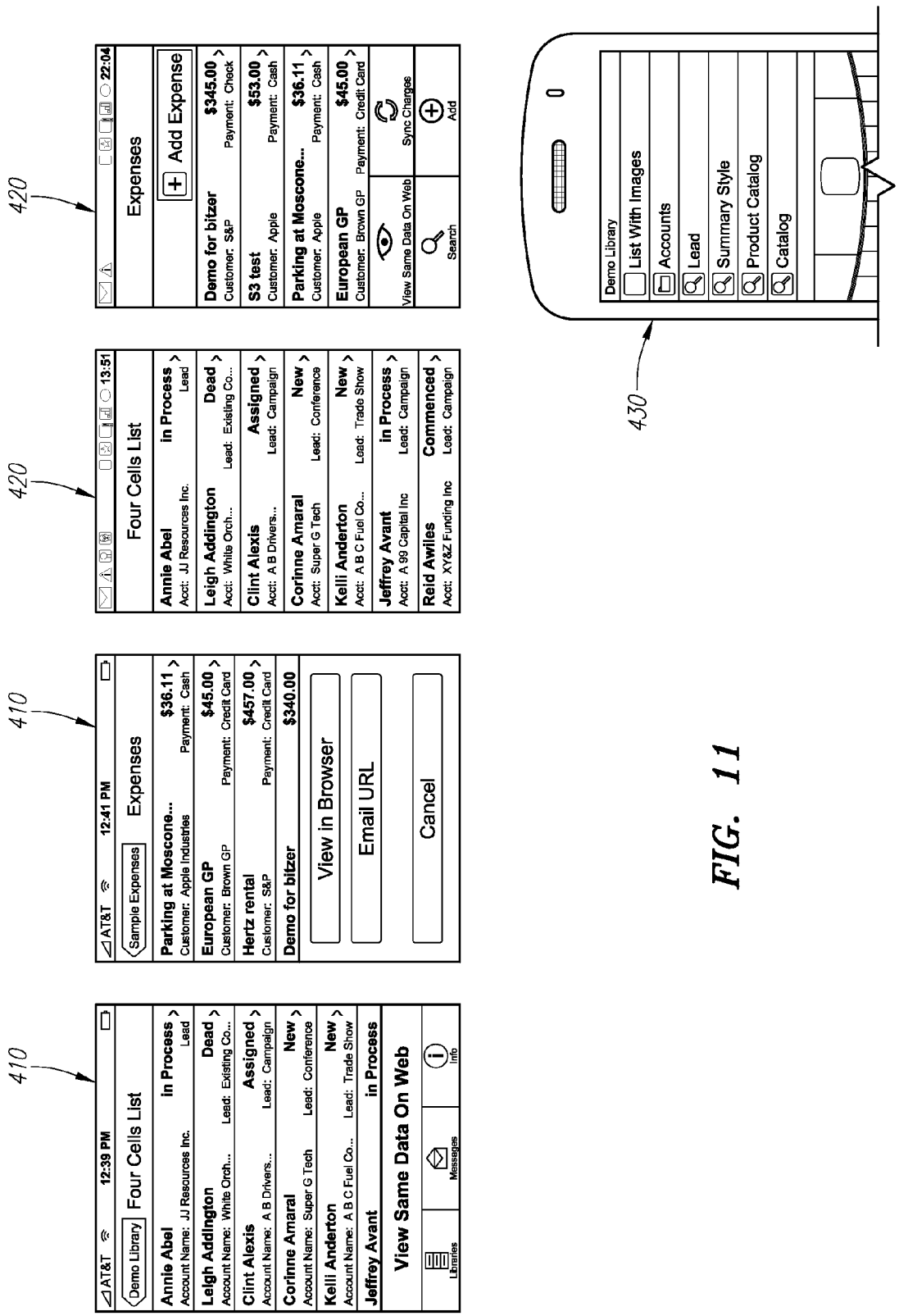
FIG. 11 illustrates how the use of a virtualization layer may provide customized views of the same data on various platforms.

FIG. 11 illustrates how the use of a VL 300 may provide customized views of the same data on various platforms. The data is shown using a single VL 300 instantiation on an iPhone 410, Android platform in 420, and on a Blackberry 430. VL 300 may define any format template and in other embodiments templates can include graphs, charts, dashboards and other data representation formats.

What is claimed is:

1. A method of enabling content distribution for various electronic devices comprising:
   receiving, on a first electronic device, a content file comprising:
      a virtualization layer with data or a link to a data source and
      format information;
   instructing by the virtualization layer a first application on the first electronic device to select a first template from a plurality of templates on the first electronic device, the first template being specific to a platform of the first electronic device;
   mapping a portion of the data to the first template;
   displaying on the first electronic device at least a portion of the mapped data as editable in place after a user selects an edit button as specified by the virtualization layer;
   receiving, on a second electronic device, the content file having the virtualization layer;
   instructing by the virtualization layer a second application on the second electronic device to select a second template for the second electronic device, the second template being specific to a platform of the second electronic device, wherein the platforms of the first and second electronic devices are different from one another and the first and second templates are different from one another;
   mapping a portion of the data to the second template; and
   presenting on the second electronic device a portion of the data as originally editable without the user needing to select an edit button, as specified by the virtualization layer.

2. The method of claim 1, wherein the format information is defined in hypertext markup language (HTML) tags.

3. The method of claim 1, wherein the first electronic device is a mobile device and the second electronic device is a personal computer.

4. The method of claim 1, further comprising:
retrieving data from the data source.

5. The method of claim 4, wherein the data source is a web server.

6. The method of claim 1, wherein the content file includes a web page configured to be displayed by a web browser.

7. The method of claim 1, wherein the content file is configured to allow the first application to interface with a web application designed to be displayed on a web browser.

8. The method of claim 1, further comprising:
dynamically loading the first template into the first application based on the format information.

9. The method of claim 1, further comprising: not loading an image or media data file in the data unless the image or media data file is explicitly marked by the virtualization layer.

10. The method of claim 1, further comprising:
authenticating a user; and
logging the first application through the virtualization layer; and
displaying only components, forms, views and data that the user is allowed to see.

11. A non-transitory computer memory embodying information indicative of instructions for causing one or more processors to perform operations comprising:
receiving, on a first electronic device, a content file comprising:
a virtualization layer with data or a link to a data source and
format information;
instructing by the virtualization layer a first application on the first electronic device to select a first template from a plurality of templates on the first electronic device, the first template being specific to a platform of the first electronic device;
mapping a portion of the data to the first template;
displaying on the first electronic device at least a portion of the mapped data as editable in place after a user selects an edit button as specified by the virtualization layer;
receiving, on a second electronic device, the content file having the virtualization layer;
instructing by the virtualization layer a second application on the second electronic device to select a second template for the second electronic device, the second template being specific to a platform of the second electronic device, wherein the platforms of the first and second electronic devices are different from one another and the first and second templates are different from one another;
mapping a portion of the data to the second template; and
presenting on the second electronic device a portion of the data as originally editable without the user needing to select an edit button, as specified by the virtualization layer.

12. The memory of claim 11, wherein the format information is defined in hypertext markup language (HTML) tags.

13. The memory of claim 11, wherein the first electronic device is a mobile device and the second electronic device is a personal computer.

14. The memory of claim 11, wherein the instructions further comprise:
instructions for retrieving data from the data source.

15. The memory of claim 14, wherein the data source is a web server.

16. A computer system comprising:
a processor; and
a memory operatively coupled with the memory, the processor executing instructions from the memory, the instructions comprising:
instructions for receiving, on a first electronic device, a content file comprising:
a virtualization layer with data or a link to a data source and
format information;
instructions for instructing by the virtualization layer a first application on the first electronic device to select a first template from a plurality of templates on the first electronic device, the first template being specific to a platform of the first electronic device;
instructions for mapping a portion of the data to the first template;
instructions for displaying on the first electronic device at least a portion of the mapped data as editable in place after a user selects an edit button as specified by the virtualization layer;
instructions for receiving, on a second electronic device, the content file having the virtualization layer;
instructions for instructing by the virtualization layer a second application on the second electronic device to select a second template for the second electronic device, the second template being specific to a platform of the second electronic device, wherein the platforms of the first and second electronic devices are different from one another and the first and second templates are different from one another;
instructions for mapping a portion of the data to the second template; and
instructions for presenting on the second electronic device a portion of the data as originally editable without the user needing to select an edit button, as specified by the virtualization layer.

17. The system of claim 16, wherein the format information is defined in hypertext markup language (HTML) tags.

18. The system of claim 16, wherein the first electronic device is a mobile device and the second electronic device is a personal computer.

19. The system of claim 16, wherein the instructions further comprise:
instructions for retrieving data from the data source.

20. The system of claim 19, wherein the data source is a web server.

* * * * *

UNITED STATES PATENT AND TRADEMARK OFFICE
CERTIFICATE OF CORRECTION

PATENT NO. : 9,645,992 B2  
APPLICATION NO. : 13/215178  
DATED : May 9, 2017  
INVENTOR(S) : Ahmed It is certified that error appears in the above-identified patent and that said Letters Patent is hereby corrected as shown below:

On the Title Page

Column 2, under Other Publications, Line 2, delete "/enenterprise/" and insert -- /enterprise/ --, therefor.

On page 2, Column 2, under Other Publications, Line 2, delete "Appiication" and insert -- Application --, therefor.

On page 2, Column 2, under Other Publications, Line 12, delete "cloudaatewav-" and insert -- cloudgateway- --, therefor.

On page 2, Column 2, under Other Publications, Line 13, delete "manaqement." and insert -- management. --, therefor.

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*